United States Patent
Christiansen

(10) Patent No.: US 9,066,476 B2
(45) Date of Patent: Jun. 30, 2015

(54) IRRIGATION SYSTEMS, IRRIGATION COMPONENTS AND RELATED METHODS

(75) Inventor: Robert O. Christiansen, Beaver, UT (US)

(73) Assignee: Christiansen Farms, Beaver, UT (US)

( * ) Notice: Subject to any disclaimer, the term of this patent is extended or adjusted under 35 U.S.C. 154(b) by 470 days.

(21) Appl. No.: 13/542,336

(22) Filed: Jul. 5, 2012

(65) Prior Publication Data

US 2014/0008451 A1 Jan. 9, 2014

(51) Int. Cl.
| | |
|---|---|
| B05B 3/00 | (2006.01) |
| A01G 25/09 | (2006.01) |
| E03B 7/07 | (2006.01) |
| B05B 15/00 | (2006.01) |
| B01D 17/02 | (2006.01) |

(52) U.S. Cl.
CPC ............. *A01G 25/092* (2013.01); *A01G 25/09* (2013.01); *E03B 7/07* (2013.01); *B05B 15/008* (2013.01); *B01D 17/0211* (2013.01); *Y10S 239/23* (2013.01)

(58) Field of Classification Search
CPC .... A01G 25/092; A01G 25/09; B05B 15/008; E03B 7/07; B01D 17/0211; Y10S 239/23
USPC ....................... 239/723–742, 575, 590–590.5, 239/203–206, DIG. 23; 210/94, 265
See application file for complete search history.

(56) References Cited

U.S. PATENT DOCUMENTS

| | | | |
|---|---|---|---|
| 908,308 A | 12/1908 | Mueller | |
| 1,152,831 A | 9/1915 | Monteagle | |
| 1,251,601 A | 1/1918 | Weiwoda | |
| 1,508,480 A | 9/1924 | Skinner | |
| 1,630,287 A | 5/1927 | Amdursky | |
| 4,135,539 A * | 1/1979 | Hunter et al. | ................. 239/731 |
| 4,156,504 A | 5/1979 | Hegemann | |
| 5,087,355 A | 2/1992 | Godec | |
| 5,132,013 A | 7/1992 | Thompson | |
| 5,401,404 A * | 3/1995 | Strauss | ......................... 210/265 |
| 5,595,656 A | 1/1997 | Yun | |
| 5,702,617 A | 12/1997 | Price | |
| 5,863,443 A | 1/1999 | Mainwaring | |
| 7,032,834 B1 | 4/2006 | Anderson et al. | |
| 7,604,710 B2 * | 10/2009 | Haslem et al. | ................ 239/725 |
| 7,766,262 B2 | 8/2010 | Gillespie et al. | |

OTHER PUBLICATIONS

Action Machining, Inc., Filters, http://www.actionfilters.com/content/?page=8, 2 pgs.

(Continued)

*Primary Examiner* — Steven J Ganey
(74) *Attorney, Agent, or Firm* — Holland & Hart, LLP

(57) ABSTRACT

Irrigation systems, irrigation components and related methods are provided. In one example, an irrigation system includes at least one irrigation span configured for fluid communication with a water source, where the irrigation span includes a pipe and at least one sprinkler nozzle in fluid communication with the pipe. One or more drive units are associated with irrigation span or spans for selectively displacing the span or spans. A separator is in fluid communication with the pipe. The separator includes a housing defining an inlet, a first outlet and a second outlet. A screen divides an interior space of the housing into a first zone and a second zone, wherein the first outlet is associated with the first zone and the second outlet is associated with the second zone. A valve is in fluid communication with the first outlet and a dispersing structure is in fluid communication with the second outlet.

19 Claims, 5 Drawing Sheets

(56) References Cited

OTHER PUBLICATIONS

General Irrigation, Sand Trap, http://www.generalirrigation.com/store_sa.html, 1 pg.

Morrill Industries, Inc., 1000 Series Horizontal Filter, www.morrillinc.com, 2010, 2 pgs.

Morrill Industries, Inc., 400 Series Safety Filter, www.morrillinc.com, 2010, 2 pgs.

* cited by examiner

IRRIGATION SYSTEMS, IRRIGATION COMPONENTS AND RELATED METHODS

TECHNICAL FIELD

The present invention relates generally to the irrigation of crops and, more specifically, to irrigation systems, components and methods that provide for the separation and disposal of debris that may enter into the irrigation system.

BACKGROUND

A variety of irrigation systems are utilized in agricultural endeavors in an effort to provide sufficient water to crops. Such irrigation systems are conventionally designed to distribute the water in a relatively even manner across a defined area. Some conventional types of irrigation systems include what are known as wheel-line systems and center pivot systems. When functioning properly, these types of systems may be used to provide water to large tracts of land in a relatively effective and efficient manner. Of course a variety of other systems are also known and employed in the art.

Water may be provided to such irrigation systems from a variety of sources including, for example, rivers, reservoirs, wells or other bodies of water. Conventionally, sources of water for irrigation purposes are not considered "potable" and may contain various particulates and debris. For example, sand, gravel, weeds, leaves, twigs and branches, garbage, and a number of other items may be contained in the water that is provided to an irrigation system from the water source. If such material enters into the irrigation system, it may clog the pipes or conduits that transport the water. Additionally, it may clog the nozzles or guns that distribute the water onto the crops. Often the clogged components will require disassembly and cleaning of the irrigation system to restore it to proper operation. The continual maintenance associated with cleaning and unclogging an irrigation system can require substantial time and expense.

Even if such debris does not completely clog the irrigation system, it can cause substantial inefficiencies in the irrigation system by reducing the flow of water. If, for example, water passes to a few nozzles or guns, but is prevented from reaching all of the nozzles or guns, the crop field will be watered unevenly. A single irrigation system may include hundreds of sprinkler nozzles that include relatively small nozzle orifices. Debris can easily clog such nozzles and, if even a handful of nozzles are clogged, uneven watering will result. Additionally, even if water passes through all of the nozzles or sprinkler guns, but at a reduced flow rate due to partial blockage, distribution of the water to the crop field will not be what was anticipated. In either case, the crops will suffer if the blockages are not remediated.

In many cases, some type of filter may be placed between the water source and the inlet of an irrigation system in an effort to prevent debris from entering the irrigation system (or at least reduce the amount of debris entering the system). However, such filters are not foolproof and often only serve to remove larger items while still allowing smaller items, such as sand and gravel, to pass through. In an effort to prevent smaller items from clogging distribution nozzles or spray guns, the inlets to individual nozzles and guns have conventionally been placed on the upper portion of a distribution pipe, with the hope that the heavier particles (e.g., sand particulates or gravel) will largely flow along the lower portion of the pipe and not enter into the sprinkler nozzles or guns. Even in this type of an arrangement, some systems may employ individual filters for each nozzle or gun to prevent or at least reduce clogging.

Despite having filters positioned at an inlet of an irrigation system, as well as at locations associated with individual sprinkler nozzles or guns, debris may accumulate at or near the end of the flow path associated with an irrigation system. Some systems include an end plug to account for such a situation. The end plug enables the irrigation system to open at the end opposite the inlet so that water can run through the system to flush out any built-up debris. Once the debris is flushed from the system, the end plug may be replaced and the irrigation system placed back in operation. While relatively effective, use of an end plug can be labor and time intensive. For example, one down side of such a method of flushing is that the source of the water must be shut off in order to remove the plug, then the water must be turned back on to flush the debris from the line and the water must be again turned off to reinstall the plug, the water having to be turned on again to continue irrigating.

It is a continued desire of the industry to improve the efficiency and effectiveness of irrigation systems.

BRIEF SUMMARY OF THE INVENTION

Various embodiments of irrigation systems, irrigation components and related methods are provided. In accordance with one aspect of the present invention, an irrigation system is provided that includes at least one irrigation span configured for fluid communication with a water source. The at least one irrigation span includes a pipe, at least one sprinkler nozzle in fluid communication with the pipe, at least one drive unit including structure coupled with the at least one irrigation span and at least one wheel, and at least one separator in fluid communication with the pipe. The at least one separator includes a housing defining an inlet, a first outlet and a second outlet. A screen divides an interior space defined by the housing into a first zone and a second zone, wherein the first outlet is associated with the first zone and the second outlet is associated with the second zone. A valve is in fluid communication with the first outlet and a dispersing structure in fluid communication with the second outlet.

In accordance with one embodiment, the dispersing structure may include an outlet nozzle exhibiting a substantially elliptical or oval geometry. Additionally, the dispersing structure may include a splash plate disposed below the outlet nozzle. In one particular embodiment, the substantially elliptical or oval geometry of the outlet nozzle exhibits a minor diameter of approximately ½ inch. In another embodiment, the substantially elliptical or oval geometry of the outlet nozzle exhibits a minor diameter of approximately ¾ inch.

In one embodiment, the at least one irrigation span further includes a truss coupled with the pipe. In some embodiments, the at least one irrigation span includes a plurality of irrigation span arranged end to end and in fluid communication with each other. In such embodiments, the at least one drive unit may include at least one drive unit located at a junction each pair of adjacent irrigation spans. The at least one separator may be coupled with an outermost irrigation span of the plurality of irrigation spans. Additionally, the at least one separator may include a plurality of separators.

In accordance with another aspect of the present invention, a separator is provided for use in an irrigation system having a length of pipe and at least one sprinkler. The separator includes a housing defining an inlet, a first outlet and a second outlet. A screen divides an interior space defined by the housing into a first zone and a second zone, wherein the first outlet is associated with the first zone and the second outlet is associated with the second zone. A valve is in fluid communication with the first outlet and a dispersing structure in fluid communication with the second outlet.

In accordance with one embodiment, the dispersing structure may include an outlet nozzle exhibiting a substantially elliptical or oval geometry. Additionally, the dispersing structure may include a splash plate disposed below the outlet nozzle. In one particular embodiment, the substantially elliptical or oval geometry of the outlet nozzle exhibits a minor diameter of approximately ½ inch. In one embodiment, the screen includes a plurality of openings exhibiting a size of approximately ¼ inch by ¼ inch.

In accordance with another aspect of the present invention, a method of operating an irrigation system is provided. The method includes providing at least one irrigation span including a pipe and at least one sprinkler. Water containing debris is flowed through the pipe such that at least some debris passes downstream from the at least one sprinkler and to the end of the main supply line. Water and at least some debris is passed into a separator. Debris that enters into the separator and that is a defined size or smaller is passed from a first zone of the separator, through openings of a screen to a second zone of the separator and out an outlet nozzle that is approximately the same size as, or larger than, the openings of the screen. Debris that enters into the separator and that is greater than the defined size is retained within the first zone of the separator. The first zone of the separator is periodically purged.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Figure 1:
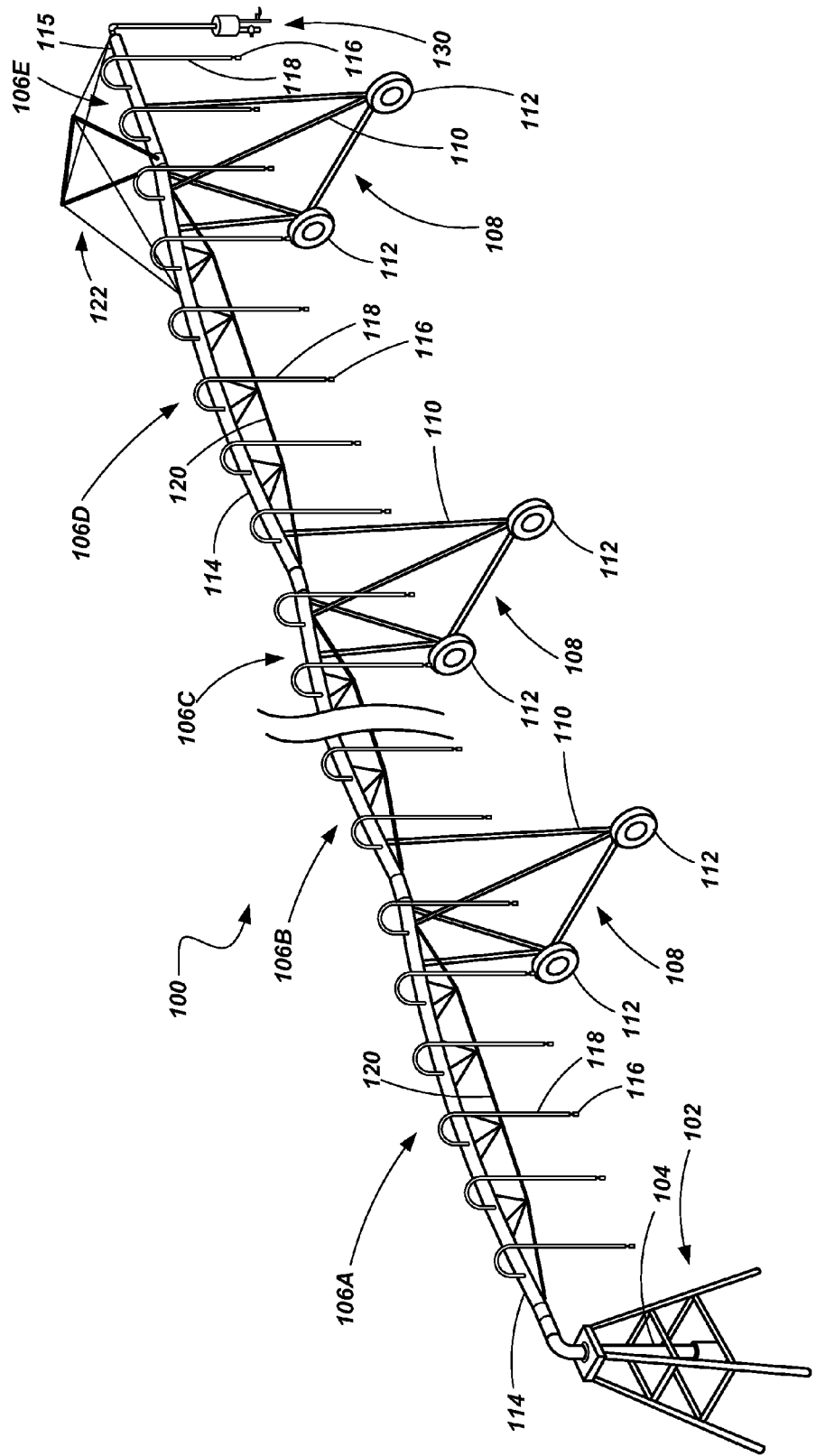
FIG. 1 is a perspective view of an irrigation system according to an embodiment of the invention.

Referring to FIG. 1, an irrigation system 100 is shown. The system 100 is configured as a center pivot system, although other configurations are contemplated as being used. The system 100 includes a tower 102 or other structure that acts as a center pivot. A supply pipe 104 is positioned vertically within the tower 102 and is in fluid communication with a water source (not shown) such as, for example, a reservoir, a river, a well or any other appropriate source. As desired, a filter mechanism or system may be utilized to remove large solid debris from the water prior to its entrance into the supply pipe 104.

The supply pipe 104 is coupled to, and in fluid communication with, a first irrigation span 106A or segment. The first span 106A may be coupled to adjacent spans (e.g., 106B, 106C and 106D) by appropriate coupling mechanisms such that each is in fluid communication with the others. Structurally coupled between each span is a drive unit 108 that may be self propelled. The drive units 108 may include, for example, an A-frame structure 110 coupled to adjacent spans. The drive units may also include one or more wheels or tires 112 coupled to the A-frame structure 110. The wheels or tires 112 are configured to roll over the terrain so that the irrigation system 100 may rotate about its pivot at the tower 102.

While not specifically shown, the drive units 108 may each include, for example, an electrical or hydraulic actuator that drives one or more of the wheels 112. A swivel may be coupled between the supply pipe 104 and the first span 106A to enable the various spans 106A-106D to rotate as a unit about the tower 102 when being driven by the various drive units 108. Because each drive unit 108 is positioned at a different distance from the tower (and, thus, from the pivot point about which the irrigation system rotates), the drive units 108 may be controlled or programmed to drive at different speeds in order to keep all of the spans 106A-106D radially aligned with one another. Stated otherwise, a drive unit 108 positioned closer to the tower (e.g., the drive unit coupled between spans 106A and 106B) will travel a shorter distance during one complete revolution of the irrigation system 100 than will a drive unit 108 that is positioned at a radial distance that is further from the tower 102 (e.g., the drive unit that is coupled between 106C and 106D).

In one embodiment, most (if not all) of the irrigation spans 106A-106D may be configured substantially similar to one another. For example, considering the radial innermost span 106A, it may include a section of pipe 114 having a plurality of irrigation or sprinkler nozzles 116 coupled to it in a spaced apart manner. While the nozzles 116 shown are sprinkler type nozzles attached to drop sections 118 (as will be described further below), other types of sprinklers may be used if desired. For example, rotary impact type "guns," which are generally placed on top of the pipe 114, may be used if desired. In other embodiments, a combination of different types of sprinklers may be used to obtain a desired distribution of water. Often, the number of sprinklers utilized for a give span will depend, at least in part, on the type of sprinklers being used and the coverage or distribution pattern that they provide.

As shown in the embodiment illustrated in FIG. 1, the section of pipe 114 may be slightly bent or bowed upwards in the middle. A truss 120, or other structural components, may be coupled to the pipe 114 to provide a desired level of support and structural rigidity. In one embodiment, the pipe 114 may exhibit an outer diameter of approximately 5 inches to approximately 10 inches. The length of the spans 106A-106D may vary from one irrigation system to another. For example, in one embodiment, the spans may be approximately 90 feet to 200 feet long. Likewise, the number of spans used may vary from one system to another. For example, a number of spans may be combined to collectively extend a distance of up to approximately 2,100 feet, or more, if desired, and cover a crop circle of between 150 and 200 acres (or greater). Indeed, the limitation on the length of the system 100 is largely based on the availability of water to be supplied to the system 100. In other embodiments, fewer spans (and/or shorter spans) may be used and a smaller area of crops may be covered by the irrigation system 100.

In the embodiment illustrated by FIG. 1, an end span 106E is shown that is configured in a different manner, structurally speaking, than the other spans 106A-106D. The end span 106E includes a section of pipe 115 that is cantilevered from an associated A-frame structure 110 positioned radially inwardly toward the tower 102. Cables, tie rods or other structural components 122 may be used to structurally support the cantilevered end section 106E. The end span 106E includes nozzles 116 as with the other spans 106A-106D. Optionally, while not shown, the end span 106E may include an "end gun" which is a rotary impact type sprinkler that expands the irrigation coverage radially out beyond the distal end of the end span 106E. Attached to the end span 106E is a separator 130 that will be discussed in further detail below. In one embodiment, the end section 106E may extend a distance of, for example, up to 100 feet, although shorter and longer spans are contemplated.

The irrigation system 100 may be configured to be operated at a variety of pressures. The pressure at which the system 100 is operated may depend on a number of factors including, for example, the types of nozzles 116 being used, the type of crop being watered and the soil conditions. In one embodiment, a high pressure system may be employed that operates at pressures between approximately 65 to approximately 90 pounds per square inch (psi). In another embodiment, the system may be operated at pressures between approximately 30 and 65 psi. In yet another embodiment, a low pressure system may be employed that operates at pressures between about 10 psi and about 30 psi and, more specifically between about 10 psi and about 15 psi. In systems that extend a substantial length from the tower 102, one or more booster pumps may be employed, if necessary, to maintain the pressures at desired levels throughout all of the spans regardless of their position relative to the inlet.

Figure 2:
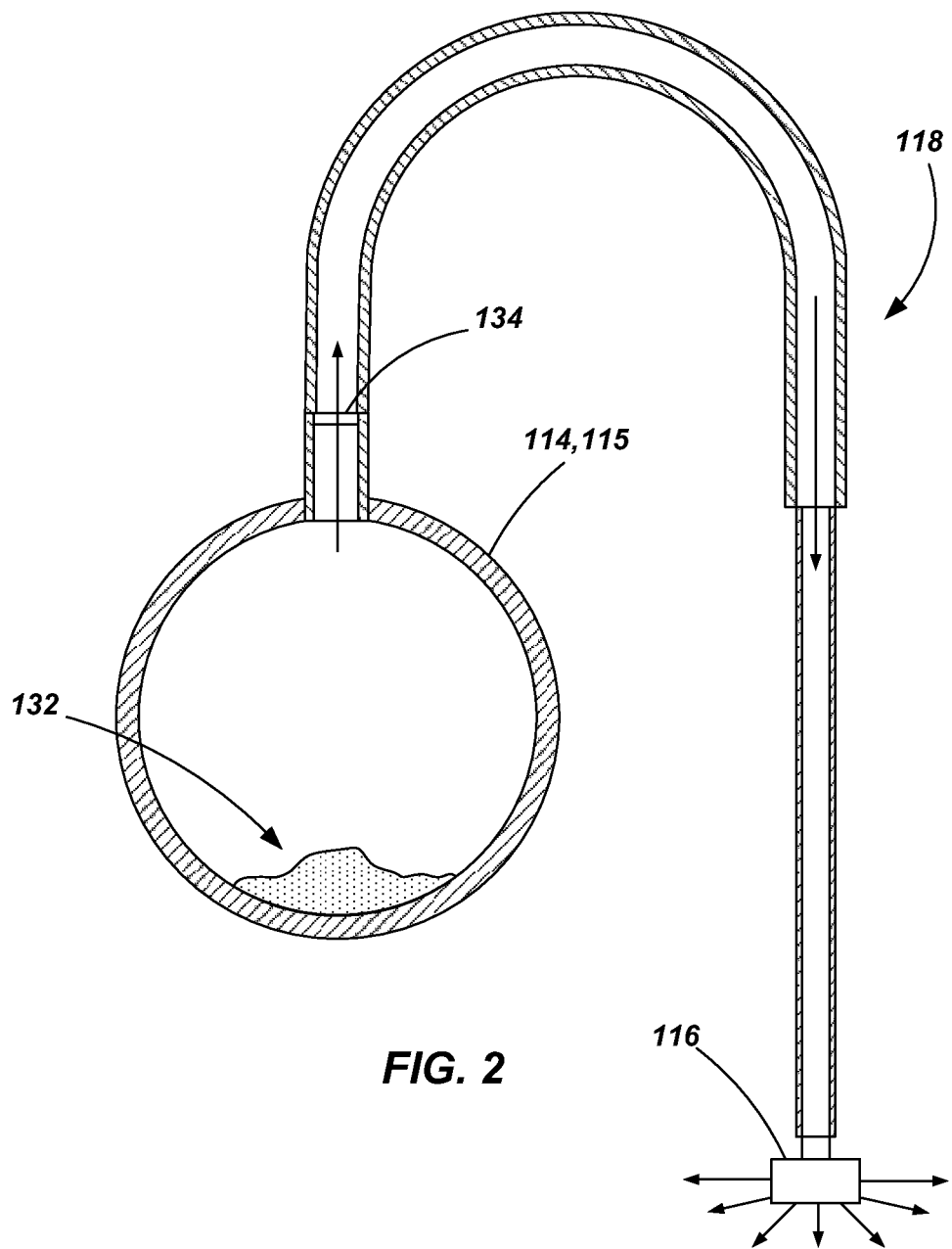
FIG. 2 is a cross-sectional view of certain components from the irrigation system shown in FIG. 1.

Referring briefly to FIG. 2, a cross-sectional view is shown of a water pipe 114 (or 115) and a nozzle 116 with associated components is illustrated. As noted above, the nozzle 116 is shown as spray type nozzle and is coupled to the pipe 114 by way of a conduit that acts as a drop section 118. The drop section 118 may be formed from pipe or tubing, or a combination of both, and positions the nozzle 116 at a location nearer the crops being irrigated. The positioning of the nozzle 116 below the pipe 114 helps to provide a desired irrigation pattern and also reduce the amount of evaporation that may take place as the sprayed water travels through the air to the soil below.

As previously noted, debris 132, such as sand, gravel, and other items may enter the irrigation system 110 despite efforts to filter the irrigation water at, or prior to, the inlet of the system 100. Often, such debris may settle toward the bottom of the pipes 114 and be carried by the water flow through the pipes 114 of the various spans toward the radial outer end of the system 100. Because much of the debris, such as sand or gravel, will settle and flow along the bottom portion of the pipes 114, water is drawn from the top of the pipes 114 through the drop sections 118 to minimize the amount of debris that may flow therethrough. In some embodiments, as noted previously, a filter 134 may be associated with each nozzle 116 to help prevent debris of a selected size from entering into the drop section 118 and clogging the orifices of the nozzle 116. It is noted that such a filter may placed at another location in the flow stream depending, for example, on accessibility for cleaning and/or replacement of such a filter.

Even with such measures being taken to prevent the nozzles 116 from becoming clogged, the existence of the debris in the pipes 114 and 115 can pose a problem as it will eventually collect within the pipes and build up to a level that causes flow and pressure problems for the system 100. As such, the system 100 also includes one or more separators 130 that enable the debris that passes through the pipes 114 and 115 to be easily discharged and help to prevent accumulation of such debris within the irrigation system 100.

Figure 3:
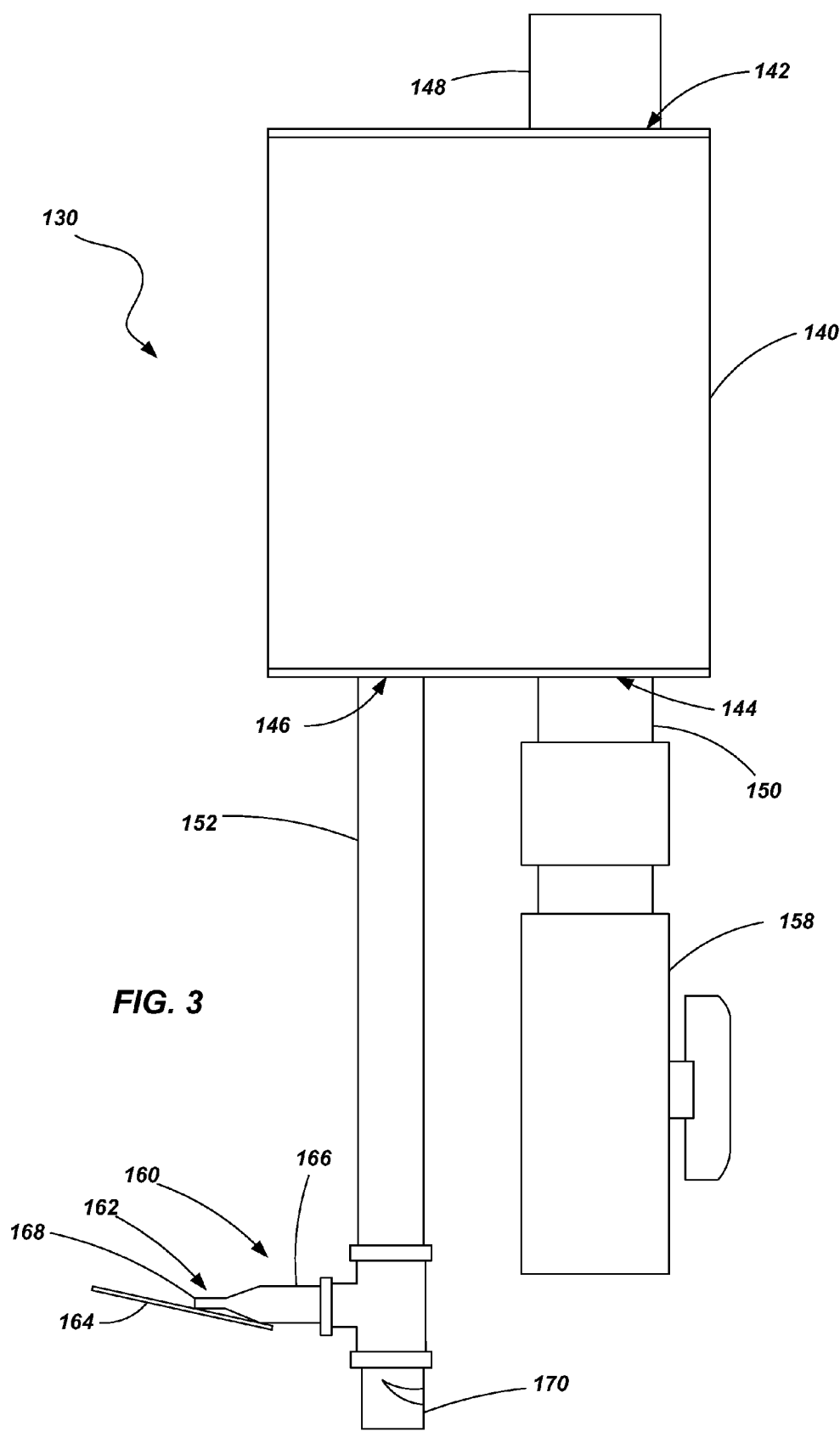
FIG. 3 is a side view of a component associated with an irrigation system according to an embodiment of the invention.
Figure 4:
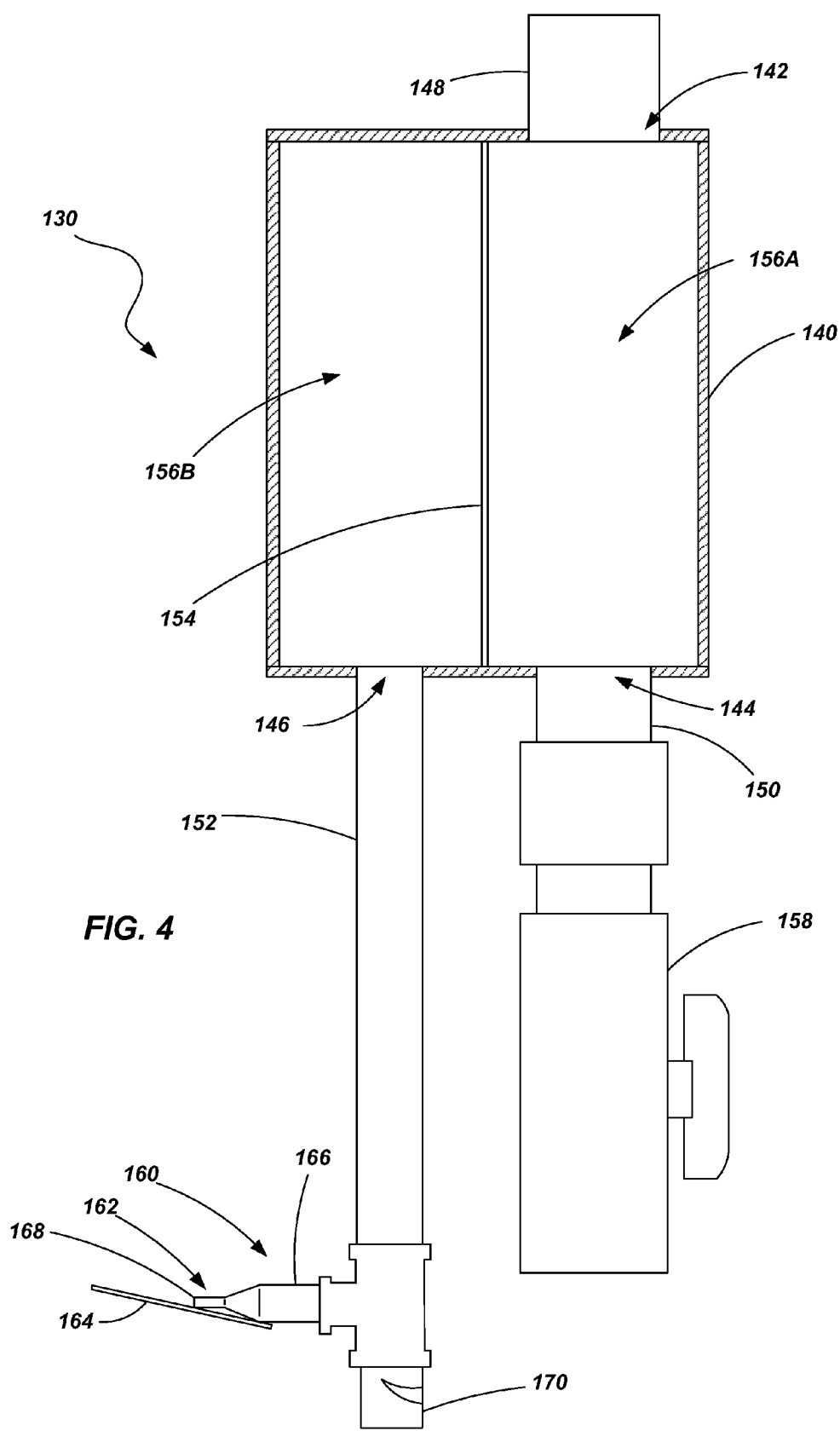
FIG. 4 is a partial cross-sectional view of the component shown in FIG. 3.

Referring now to FIGS. 3 and 4, FIG. 3 is a side view of a separator 130 and FIG. 4 is a cross-sectional view of a separator 130 in accordance with an embodiment of the invention. The separator 130 includes a housing 140 having an inlet 142, a first outlet 144 and a second outlet 146. A conduit 148 is coupled with the inlet 142 and is in fluid communication with the pipes 114 and 115 of the irrigation system. Additional conduits 150 and 152 are coupled to, and in fluid communication with, the first and second outlets 144 and 146.

A screen 154 (FIG. 4) is positioned within the housing and divides the interior space or volume defined by the housing 140 into two volumes or zones 156A and 156B such that the first outlet 144 is on one side of the screen 154 and in direct fluid communication with the first zone 156A and the second outlet is on the opposing side of the screen and in direct fluid communication with the second zone 156B. The screen 154 includes a number of openings that are sized and configured to permit debris of a specified size or smaller to travel through the screen 154 from the first zone 156A to the second zone 156B, while restricting debris that is larger than the specified size from passing through such that the larger debris remains in the first zone 156A.

The conduit 150 associated with the first outlet 144 is coupled with a valve 158 that may be manually operated or associated with an actuator and operated by associated controls. In the embodiment shown in FIGS. 3 and 4, the valve 158 includes a ball valve, but other types of valves may be utilized.

Figure 5:
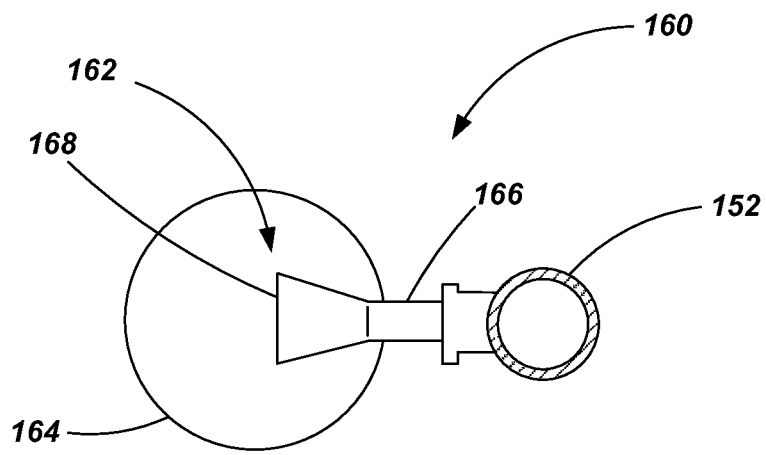
FIG. 5 is a partial cross-sectional view of a portion of the component in FIG. 4.
Figure 6:
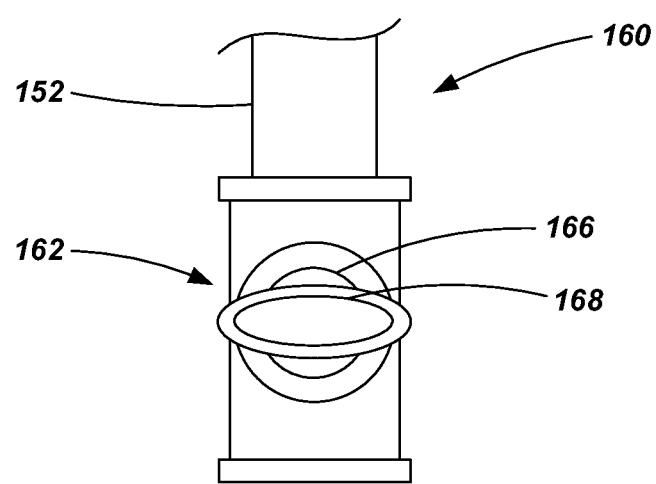
FIG. 6 is an side view of a portion of the component shown in FIG. 3.

The conduit 152 associated with the second outlet 146 is coupled to, and in fluid communication with, a dispensing structure 160. The dispensing structure 160 includes an outlet nozzle 162 and a dispersing plate 164 positioned beneath the outlet nozzle 162. Referring to FIGS. 5 and 6, in conjunction with FIGS. 3 and 4, in one example, the outlet nozzle 162 may be formed from a conduit 166, such as a short length of pipe, that has an outlet end 168 flattened or deformed so that it exhibits, for example, a cross-sectional outlet geometry of an oval, an ellipse or a rectangular section with substantially rounded corners. The dispersing plate 164 may exhibit a substantially circular geometry, as best seen in FIG. 5, but may also exhibit other geometries if desired. Additionally, while shown as being substantially flat, the dispersing plate 164 may be bent, angled or curved, or exhibit a substantially concave or convex upper surface, depending, for example, on the dispersing pattern desired. It is noted that FIG. 6 does not show the dispersing plate 164 for purposes of clarity and convenience.

Still referring to FIGS. 3 and 4, another nozzle 170 may be coupled to, and in fluid communication with, the dispensing structure 160. The nozzle 170 may include an orifice or a mouth positioned to dispense fluid flow in a direction different than (e.g., in a substantially opposite direction that) the outlet nozzle 162 of the dispensing structure. In another embodiment, the nozzle 170 may be replaced by a plug such that the only outlet from the conduit 152 is the outlet nozzle 162 of the dispensing structure.

The separator 130 may be formed of a variety materials and exhibit a variety of sizes depending on the anticipated flow rates and anticipated size and volume of debris. In accordance with one particular embodiment, the separator 130 may include a housing 140 formed of a short section of steel pipe exhibiting an outer diameter of between approximately 8 inches and approximately 8 inches and exhibiting a length of approximately 10 inches with steel plates being sealingly coupled to each axial end. The inlet conduit 148 may include a 2 inch steel coupling having internal threads on the upper portion for connection with a conduit extending from the pipe of an associated span (e.g., pipe 115 from the end span 106E). The first outlet conduit 150 may include a 2 inch steel threaded nipple The valve 158 may include a 2 inch polyvinylchloride (PVC) ball valve connected to the first outlet conduit 150 by way of appropriate fittings (e.g., PVC pipe and a threaded/slip coupler). The second outlet conduit 152 may include a section of 1 inch steel pipe. The dispersing structures 160 may be coupled to the outlet conduit 152 by way of a 1 inch×1 inch×¾ inch tee, with the outlet nozzle 162 being formed from ¾ inch steel nipple (having the outlet end 168 flattened to exhibit a substantially elliptical or oval geometry with a minor diameter of approximately ½ inch) and the dispersing plate being formed of a ⅛ inch plate approximately 6 inches in diameter. The screen 154 may formed of a wire mesh material, the wire exhibiting approximately ⅛ inch diameter and the mesh exhibiting openings that are approximately ¼ inch×¼ inch. Of course, this is just one example of a specific configuration and, again, other sizes, materials and components may be utilized.

Referring generally to FIGS. 1-6, during operation of the system 100, water flows through the pipes 114, 115 carrying debris toward the distal end of the system (i.e., through the end span 106E). The debris exits the end span 106E and enters the separator 130 through the inlet 142. Debris that is smaller than the openings of the screen 154 passes through the screen into the second zone 156B, through the second outlet 146 and through the outlet nozzle 162 of the dispersing structure 160. Such debris may include, for example, sand and gravel that does not exceed a defined size. Debris that is larger than the openings of the screen 154 remains in the first zone 156A of the housing and collects there until it is purged or discharged by opening the valve 158. Such a structure enables the continual discharge of debris that is as small as, or smaller than, a specified size, such that it does not build up within the irrigation system and cause inefficient performance. Additionally, if larger debris happens to enter the irrigation system 100, it will be caught by the screen 154 and held for periodic discharge as needed. As previously mentioned, the valve 158 could be coupled with an actuator and a control system for remote opening and closing on demand, or for periodic opening and closing for a routine purge or discharge of the first zone 156A in the housing 140.

While a single separator 130 is shown in FIG. 1 as being located at the distal end of the system 100 (i.e., coupled to the end span 106E), it is noted that multiple separators 130 could be employed and placed at strategic locations throughout the system 100. For example, if the pipes 114 of the spans 106A-106D are arched or bowed up as shown in FIG. 1, the coupling locations between adjacent spans could become possible settling traps for debris. As such, separators could be located at various coupling locations between adjacent spans, if not at each coupling location, to similarly assist with the improved discharge of such debris.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:
1. An irrigation system comprising:
   at least one irrigation span configured for fluid communication with a water source, the at least one irrigation span:
      a pipe;
      at least one sprinkler nozzle in fluid communication with the pipe;
   at least one drive unit including structure coupled with the at least one irrigation span and at least one wheel;
   at least one separator in fluid communication with the pipe, the separator comprising:
      a housing defining an inlet, a first outlet and a second outlet;
      a screen dividing an interior space defined by the housing into a first zone and a second zone, wherein the first outlet is associated with the first zone and the second outlet is associated with the second zone;
      a valve in fluid communication with the first outlet; and
      a dispersing structure in fluid communication with the second outlet.

2. The system of claim 1, wherein the dispersing structure includes an outlet nozzle exhibiting a substantially elliptical or oval geometry.

3. The system of claim 2, wherein the dispersing structure includes a splash plate disposed below the outlet nozzle.

4. The system of claim 3, wherein the substantially elliptical or oval geometry of the outlet nozzle exhibits a minor diameter of approximately ½ inch.

5. The system of claim 1, wherein the inlet of the separator is associated with the first zone.

6. The system of claim 1, wherein the at least one irrigation span further includes a truss coupled with the pipe.

7. The system of claim 1, wherein the at least one irrigation span includes a plurality of irrigation span arranged end to end and in fluid communication with each other.

8. The system of claim 7, wherein the at least one drive unit includes at least one drive unit located at a junction each pair of adjacent irrigation spans.

9. The system of claim 8, wherein the at least one separator is coupled with an outermost irrigation span of the plurality of irrigation spans.

10. The system of claim 7, wherein the at least one separator includes a plurality of separators.

11. The system of claim 1, wherein the screen includes a plurality of openings exhibiting a size of approximately ¼ inch by ¼ inch.

12. The system of claim 1, further including at least one drop section coupled between the pipe and the at least one nozzle.

13. The system of claim 12, wherein the at least one nozzle includes a plurality of nozzles.

14. A separator for use in an irrigation system having a length of pipe and at least one sprinkler, the separator comprising:
   a housing defining an inlet, a first outlet and a second outlet;
   a screen dividing an interior space defined by the housing into a first zone and a second zone, wherein the first outlet is associated with the first zone and the second outlet is associated with the second zone;
   a valve in fluid communication with the first outlet; and
   a dispersing structure in fluid communication with the second outlet, wherein the dispersing structure includes an outlet nozzle exhibiting a substantially elliptical or oval geometry.

15. The separator of claim 14, wherein the dispersing structure includes a splash plate disposed below the outlet nozzle.

16. The separator of claim 15, wherein the substantially elliptical or oval geometry of the outlet nozzle exhibits a minor diameter of approximately ½ inch.

17. The separator of claim 14, wherein the inlet of the separator is associated with the first zone.

18. The separator of claim 14, wherein the screen includes a plurality of openings exhibiting a size of approximately ¼ inch by ¼ inch.

19. A method of operating an irrigation system, the method comprising:
- providing at least one irrigation span including a pipe and at least one sprinkler;
- flowing water containing debris through the pipe such that at least some debris passes downstream from the at least one sprinkler;
- passing at least some water and the at least some debris into a separator;
- passing debris that enters into the separator and that is a defined size or smaller from a first zone of the separator, through openings of a screen to a second zone of the separator and out an outlet nozzle that is approximately the same size as, or larger than, the openings of the screen;
- retaining debris that enters into the separator and that is greater than the defined size within the first zone of the separator; and
- periodically purging the first zone of the separator.

* * * * *